United States Patent
Oshima et al.

(10) Patent No.: US 11,004,605 B2
(45) Date of Patent: May 11, 2021

(54) MULTILAYER CERAMIC CAPACITOR, CIRCUIT SUBSTRATE AND MANUFACTURING METHOD OF THE SAME

(71) Applicant: TAIYO YUDEN CO., LTD., Tokyo (JP)

(72) Inventors: Michio Oshima, Takasaki (JP); Atsuhiro Yanagisawa, Takasaki (JP); Yoshinori Shibata, Takasaki (JP); Daisuke Iwai, Takasaki (JP); Hiroyuki Moteki, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 74 days.

(21) Appl. No.: 16/259,858

(22) Filed: Jan. 28, 2019

(65) Prior Publication Data
US 2019/0244758 A1 Aug. 8, 2019

(30) Foreign Application Priority Data
Feb. 8, 2018 (JP) .............................. JP2018-020912

(51) Int. Cl.
*H01G 4/30* (2006.01)
*H01G 4/12* (2006.01)
(Continued)

(52) U.S. Cl.
CPC ............ *H01G 4/1245* (2013.01); *H01G 4/012* (2013.01); *H01G 4/232* (2013.01); *H01G 4/30* (2013.01)

(58) Field of Classification Search
CPC ...... H01G 4/30; H01G 4/1245; H01G 4/1236; H01G 4/012; H01G 4/2325; H01G 4/232; H01G 4/0085
See application file for complete search history.

(56) References Cited

U.S. PATENT DOCUMENTS

| 6,014,309 A | * | 1/2000 | Ueno | ...................... H01G 4/30 361/306.3 |
| 2001/0019176 A1 | * | 9/2001 | Ahiko | ................... H01G 4/012 257/777 |

(Continued)

FOREIGN PATENT DOCUMENTS

| JP | 10294238 A | * 11/1998 |
| JP | 2009126754 A | 6/2009 |
| WO | 2012099193 A1 | 7/2012 |

*Primary Examiner* — David M Sinclair
(74) *Attorney, Agent, or Firm* — Law Office of Katsuhiro Arai

(57) ABSTRACT

A multilayer ceramic capacitor includes: a ceramic multilayer structure having a structure in which each of ceramic dielectric layers and each of internal electrode layers are alternately stacked and are alternately exposed to two edge faces of the ceramic multilayer structure, a main phase of the plurality of ceramic dielectric layers having a perovskite structure that includes Ca and Zr and is expressed by a general formula $ABO_3$; and a pair of external electrodes that are formed on the two edge faces, wherein $300 \times TE/TA - 12 \leq 30$ is satisfied when a volume TA is a length $C_L \times$a width $C_W \times$a thickness $C_T$ of the ceramic multilayer structure and a volume TE is a length $E_L \times$a width $E_W \times$a thickness $E_T \times$a stacked number of the plurality of internal electrode layers in a capacity region.

10 Claims, 10 Drawing Sheets

(51) Int. Cl.
*H01G 4/012* (2006.01)
*H01G 4/232* (2006.01)

(56) References Cited

U.S. PATENT DOCUMENTS

| | | | |
|---|---|---|---|
| 2008/0204968 A1* | 8/2008 | Takashima | H01G 4/40 |
| | | | 361/301.4 |
| 2009/0137381 A1 | 5/2009 | Takaishi et al. | |
| 2011/0141652 A1* | 6/2011 | Chang | H01G 4/30 |
| | | | 361/272 |
| 2012/0188682 A1* | 7/2012 | Sato | H01G 4/232 |
| | | | 361/305 |
| 2013/0201601 A1* | 8/2013 | Nishisaka | H01G 4/2325 |
| | | | 361/301.4 |
| 2013/0222971 A1 | 8/2013 | Nishimura et al. | |
| 2015/0332853 A1* | 11/2015 | Kageyama | H01G 4/12 |
| | | | 427/79 |
| 2017/0018362 A1* | 1/2017 | Nishisaka | H01G 4/30 |
| 2017/0125167 A1* | 5/2017 | Kawakami | H01G 4/236 |

* cited by examiner

MULTILAYER CERAMIC CAPACITOR, CIRCUIT SUBSTRATE AND MANUFACTURING METHOD OF THE SAME

CROSS-REFERENCE TO RELATED APPLICATION

This application is based upon and claims the benefit of priority of the prior Japanese Patent Application No. 2018-020912, filed on Feb. 8, 2018, the entire contents of which are incorporated herein by reference.

FIELD

A certain aspect of the present invention relates to a multilayer ceramic capacitor, a circuit substrate, and a manufacturing method of the multilayer ceramic capacitor.

BACKGROUND

There is disclosed multilayer ceramic capacitors for temperature compensation satisfying CG characteristic (0±30 ppm/° C. within 20 degrees C. to 125 degrees C.) and CH characteristic (0±60 ppm/° C. within 20 degrees C. to 125 degrees C.) that are regulated in the JIS standard, and so on (for example, see Japanese Patent Application Publication No. 2009-126754).

SUMMARY OF THE INVENTION

Downsizing of the multilayer ceramic capacitors is requested, because electronic devices are downsized and have high performance. However, when the multilayer ceramic capacitors are downsized in the analogous shape, desirable temperature characteristic may not be necessarily achieved.

The present invention has a purpose of providing a multilayer ceramic capacitor and a circuit substrate that are capable of achieving desirable temperature characteristic and a manufacturing method of the multilayer ceramic capacitor.

According to an aspect of the present invention, there is provided a multilayer ceramic capacitor including: a ceramic multilayer structure having a structure in which each of a plurality of ceramic dielectric layers and each of a plurality of internal electrode layers are alternately stacked and are alternately exposed to two edge faces of the ceramic multilayer structure, a main phase of the plurality of ceramic dielectric layers having a perovskite structure that includes Ca and Zr and is expressed by a general formula $ABO_3$; and a pair of external electrodes that are formed on the two edge faces, wherein $300 \times TE/TA - 12 \leq 30$ is satisfied when a volume TA is a length $C_L \times$a width $C_W \times$a thickness $C_T$ of the ceramic multilayer structure and a volume TE is a length $E_L \times$a width $E_W \times$a thickness $E_T \times$a stacked number of the plurality of internal electrode layers in a capacity region, the capacity region being a region in which internal electrode layers next to each other are connected to different external electrodes and face each other.

According to another aspect of the present invention, there is provided a manufacturing method of a multilayer ceramic capacitor including: forming a multilayer structure by alternately stacking a green sheet including a ceramic grain and a conductive paste for forming an internal electrode layer, the conductive paste including a ceramic co-material; forming a ceramic multilayer structure by firing the multilayer structure; and forming an external electrode on each edge face of the ceramic multilayer structure to which the internal electrode layer is exposed, wherein the stacking and the firing are performed so that $300 \times TE/TA - 12 \leq 30$ is satisfied when a volume TA is a length $C_L \times$a width $C_W \times$a thickness $C_T$ of the ceramic multilayer structure and a volume TE is a length $E_L \times$a width $E_W \times$a thickness $E_T \times$a stacked number of the internal electrode layer in a capacity region, the capacity region being a region in which internal electrode layers next to each other are connected to different external electrodes and face each other.

DETAILED DESCRIPTION

A description will be given of an embodiment with reference to the accompanying drawings.

Embodiment

Figure 1:
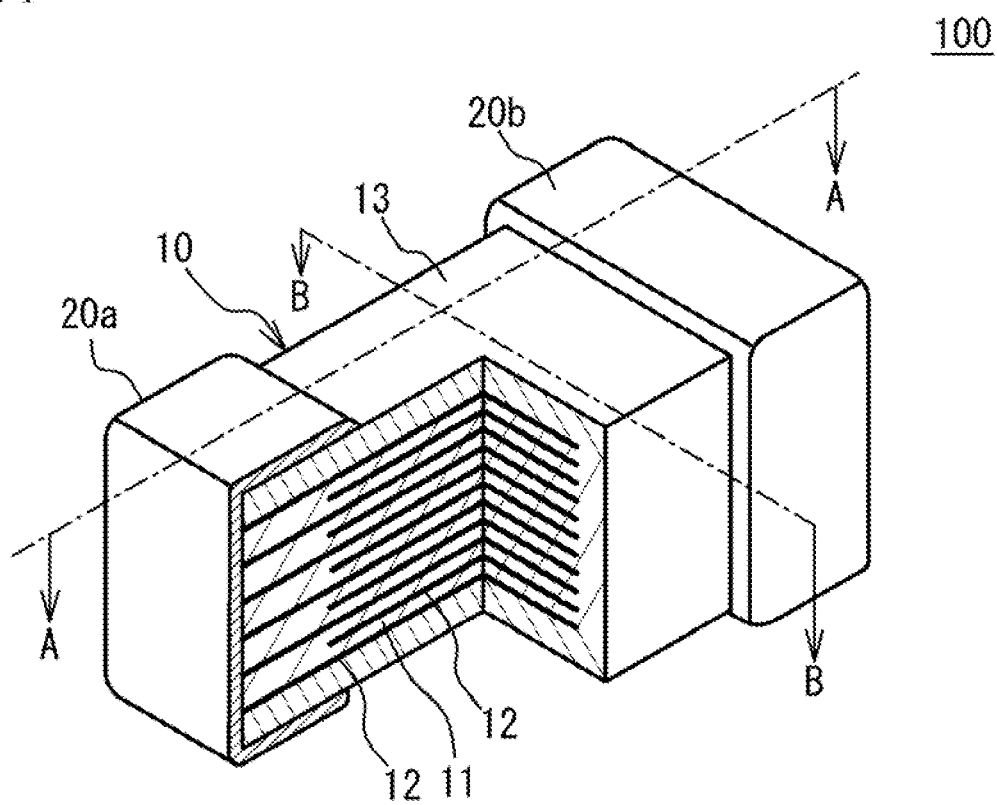
FIG. 1 illustrates a partial perspective view of a multilayer ceramic capacitor in accordance with an embodiment.

A description will be given of a multilayer ceramic capacitor. FIG. 1 illustrates a partial perspective view of a multilayer ceramic capacitor 100. As illustrated in FIG. 1, the multilayer ceramic capacitor 100 includes a ceramic multilayer structure 10 having a rectangular parallelepiped shape, and a pair of external electrodes 20a and 20b that are respectively provided at two edge faces of the ceramic multilayer structure 10 facing each other. Four faces other than the two edge faces of the ceramic multilayer structure 10 are referred to as side faces. The external electrodes 20a and 20b extend to the four side faces of the ceramic multilayer structure 10. However, the external electrodes 20a and 20b are spaced from each other.

The ceramic multilayer structure 10 has a structure designed to have ceramic dielectric layers 11 and internal electrode layers 12 alternately stacked. The ceramic dielectric layer 11 includes a ceramic material acting as a dielectric material. End edges of the internal electrode layers 12 are alternately exposed to a first edge face of the ceramic multilayer structure 10 and a second edge face of the ceramic multilayer structure 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Cover layers 13 cover an upper face and a lower face that are two of the side faces in a stacking direction of the ceramic dielectric layers 11 and the internal electrode layers 12. A main component of the cover layers 13 is a ceramic material. For example, a main component of the cover layers 13 is the same as that of the ceramic dielectric layers 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. However, the size of the multilayer ceramic capacitor 100 is not limited.

A main phase of the ceramic dielectric layers 11 is a perovskite structure that includes Ca (calcium) and Zr (zirconium) and is expressed by a general formula $ABO_3$. The perovskite structure includes $ABO_{3-\alpha}$ having an off-stoichiometric composition. The ceramic material is such as $CaZrO_3$ (calcium zirconate), $Ba(barium)_{1-x-y}Ca_xSr(strontium)_yTi(titanium)_{1-z}Zr_zO_3$ ($0<x\le1$, $0.5<x+y\le1$, $0.5<z\le1$) having the perovskite structure, and so on. A temperature changing of the electrostatic capacity of the perovskite including Ca and Zr is small. Therefore, the temperature coefficient Tc [ppm/° C.] of the perovskite including Ca and Zr is small. A thickness of the ceramic dielectric layers is, for example, 1 μm to 5 μm.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof.

Figure 2:
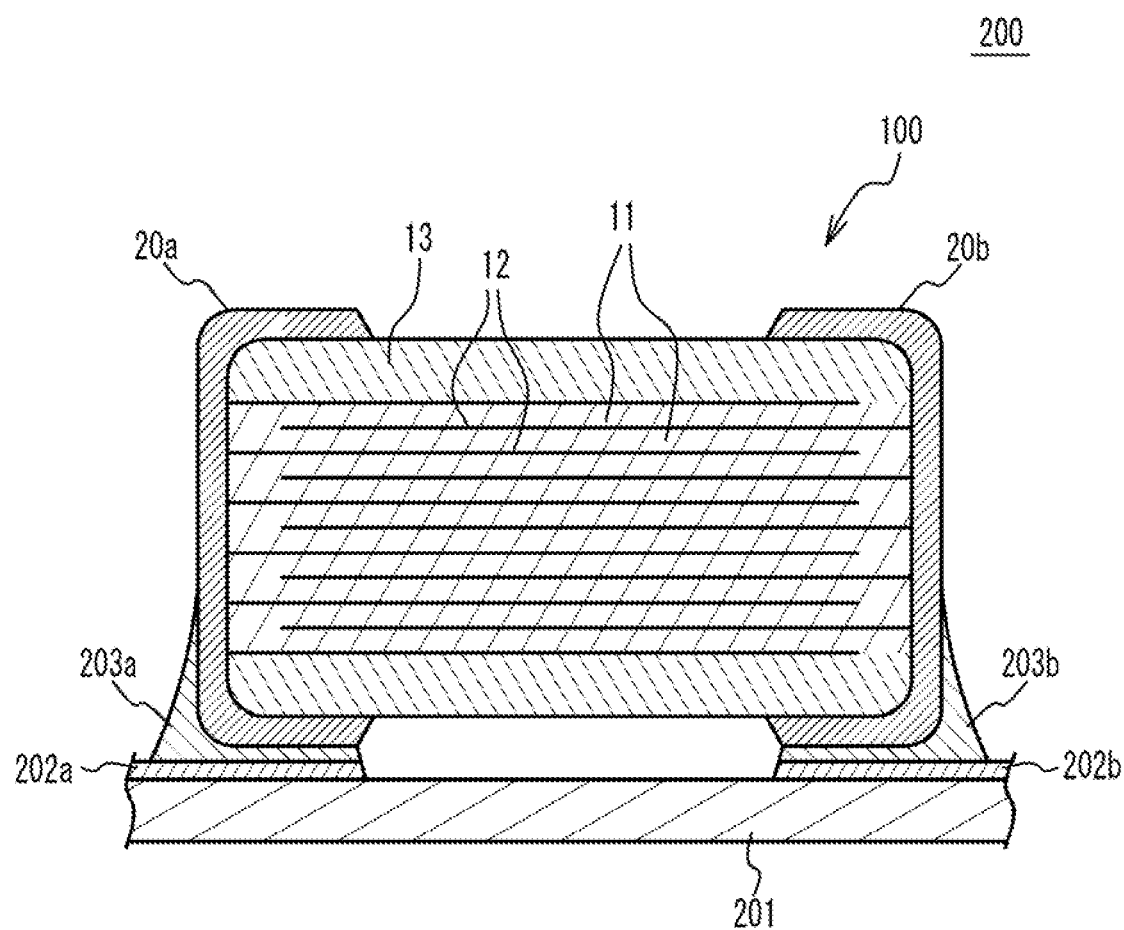
FIG. 2 illustrates a circuit substrate.

FIG. 2 illustrates a circuit substrate 200. As illustrated in FIG. 2, the circuit substrate 200 has a structure in which the multilayer ceramic capacitor 100 is mounted on a substrate 201. A wiring pattern 202a, a wiring pattern 202b and so on are provided on a mounting face of the substrate 201. The external electrode 20a is connected to the wiring pattern 202a via a solder 203a and is electrically coupled with the wiring pattern 202a. The external electrode 20b is connected to the wiring pattern 202b via a solder 203b and is electrically coupled with the wiring pattern 202b. In this manner, the multilayer ceramic capacitor 100 may be mounted on the substrate 201.

Figure 3:
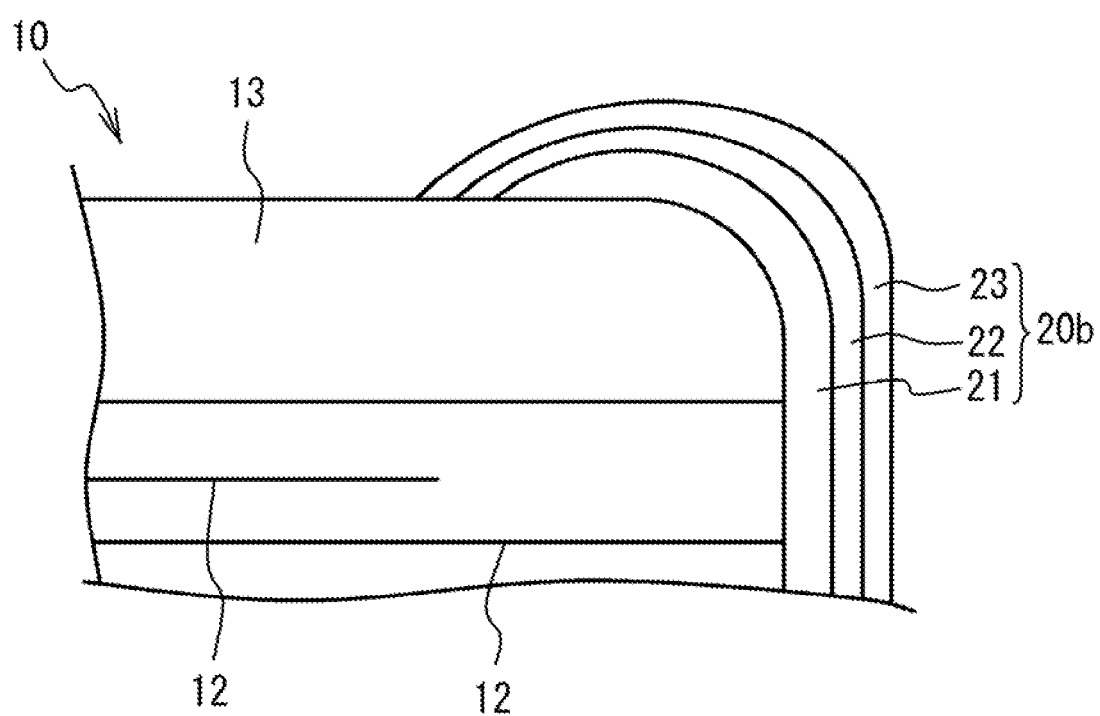
FIG. 3 illustrates a partial cross sectional view taken along a line A-A of FIG. 1.

FIG. 3 illustrates a cross sectional view of the external electrode 20b. FIG. 3 illustrates a partial cross sectional view taken along a line A-A of FIG. 1. In the cross section of FIG. 3, hatch is omitted. A ceramic material is mainly exposed to a surface of the ceramic multilayer structure 10. It is therefore difficult to form a plated layer on the surface of the ceramic multilayer structure without a base layer. And so, as illustrated in FIG. 3, the external electrode 20b has a structure in which a plated layer is formed on the base conductive layer 21 formed on the surface of the ceramic multilayer structure 10. The plated layer has a first plated layer 22 that directly contacts the base conductive layer 21 and covers the base conductive layer 21 and a second plated layer 23 that directly contacts the first plated layer 22 and covers the first plated layer 22. A base plated layer may be provided between the base conductive layer 21 and the first plated layer 22. A main component of the base conductive layer 21 is a metal such as Cu, Ni, Al (aluminum) or Zn (zinc), or an alloy of two of the metals (for example, an alloy of Cu and Ni). The base conductive layer 21 includes ceramic such as glass for densifying the base conductive layer 21 or a co-material for controlling the sintering characteristic of the base conductive layer 21. The glass component is oxide of Ba, Sr, Ca, Zn, Al, Si (silicon), B (boon) or the like. The co-material is a ceramic component of which a main component is the same as the main component of the ceramic dielectric layer 11. A main component of the plated layer is a metal such as Cu, Ni, Al, Zn or Sn or an alloy of two of the metals.

Figure 4:
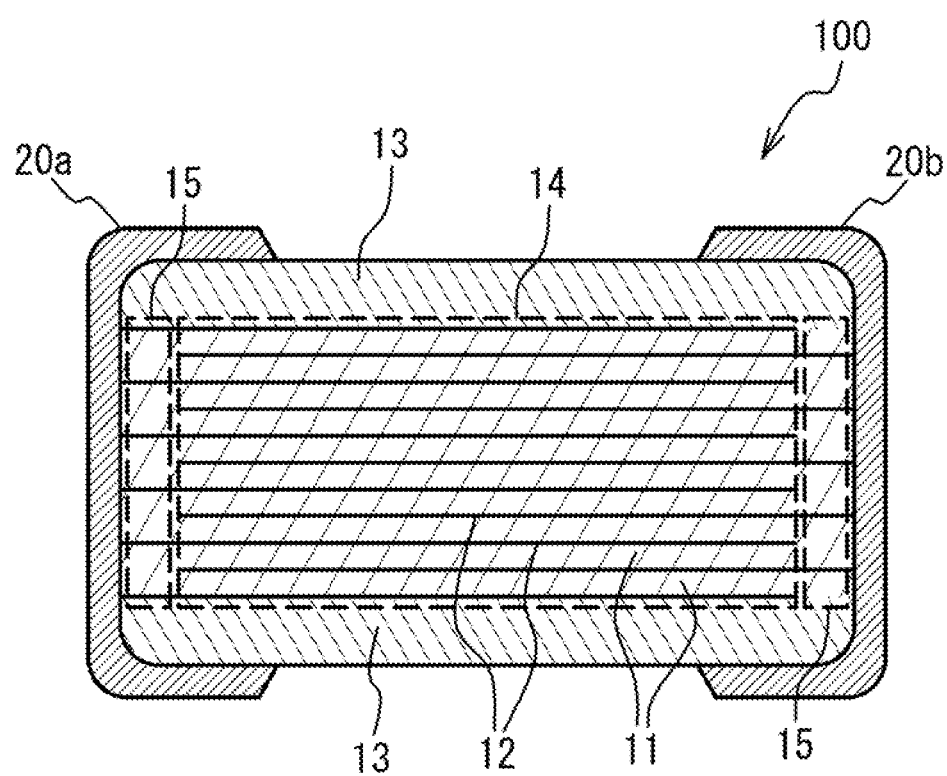
FIG. 4 illustrates a cross sectional view taken along a line A-A of FIG. 1.

FIG. 4 illustrates a cross sectional view taken along a line A-A of FIG. 1. As illustrated in FIG. 4, a region, in which a set of the internal electrode layers 12 connected to the external electrode 20a face another set of the internal electrode layers 12 connected to the external electrode 20b, is a region generating electrical capacity in the multilayer ceramic capacitor 100. And so, the region is referred to as a capacity region 14. That is, the capacity region 14 is a region in which the internal electrode layers 12 next to each other are connected to different external electrodes and face each other.

A region, in which the internal electrode layers 12 connected to the external electrode 20a face with each other without sandwiching the internal electrode layer 12 connected to the external electrode 20b, is referred to as an end margin region 15. A region, in which the internal electrode layers 12 connected to the external electrode 20b face with each other without sandwiching the internal electrode layer 12 connected to the external electrode 20a is another end margin region 15. That is, the end margin region 15 is a region in which a set of the internal electrode layers 12 connected to one external electrode face with each other without sandwiching the internal electrode layer 12 connected to the other external electrode. The end margin region 15 is a region that does not generate electrical capacity in the multilayer ceramic capacitor 100.

Figure 5:
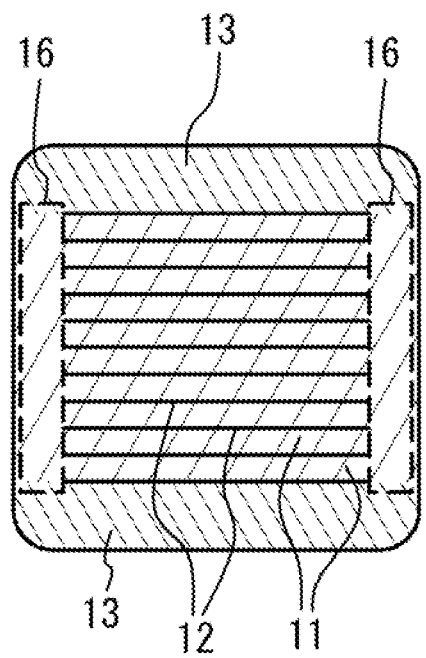
FIG. 5 illustrates a cross sectional view taken along a line B-B of FIG. 1.

FIG. 5 illustrates a cross sectional view taken along a line B-B of FIG. 1. As illustrated in FIG. 5, a region of the ceramic multilayer structure 10 from the two sides thereof to the internal electrode layers 12 is referred to as a side margin region 16. That is, the side margin region 16 is a region covering edges of the stacked internal electrode layers 12 in the extension direction toward the two side faces. The cover layer 13, the end margin region 15 and the side margin region 16 may be referred to as a surrounding region of the capacity region 14.

Downsizing of the multilayer ceramic capacitor is requested, because electronic devices are downsized and have high performance. When the multilayer ceramic capacitor is downsized in the analogous shape, desirable temperature characteristic may not be necessarily achieved. And so, the present inventors have studied and have found that desirable temperature characteristic is achieved by regulating a relationship between a volume TA of the ceramic multilayer structure 10 and a volume TE of the internal electrode layers 12 in the capacity region 14.

Figure 6:
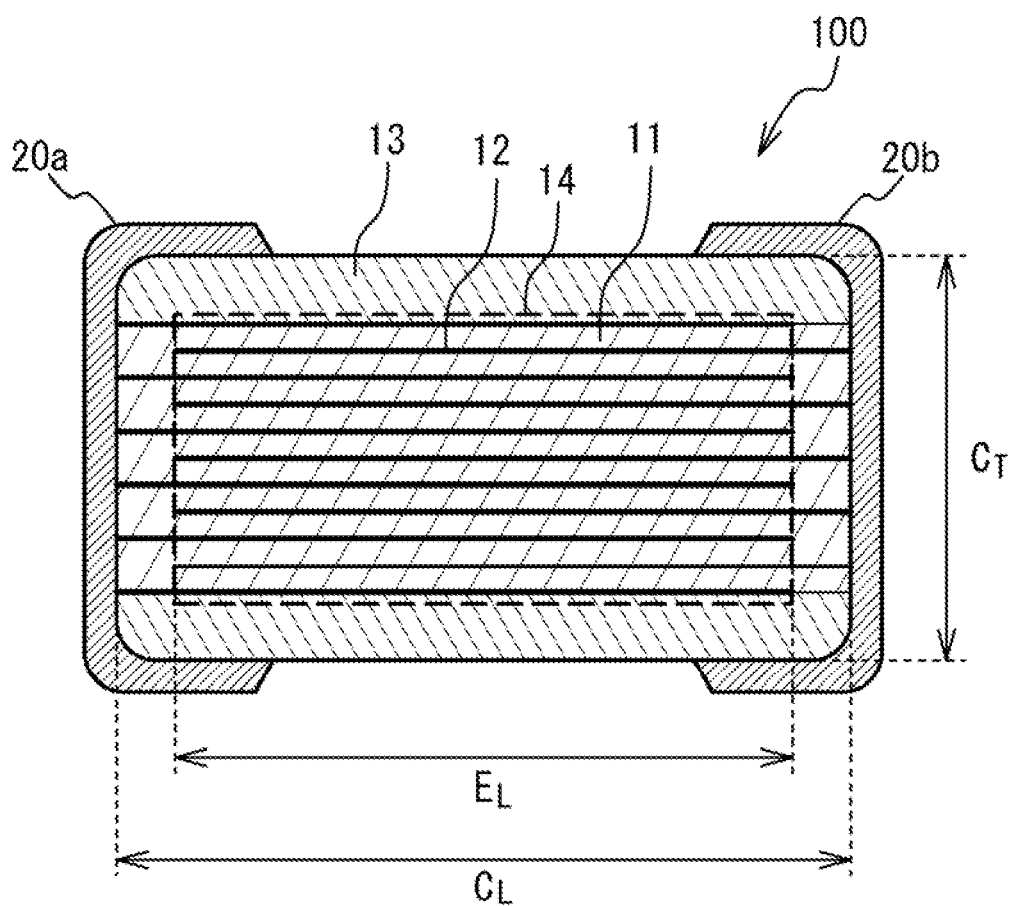
FIG. 6 illustrates a cross sectional view taken along a line A-A of FIG. 1.
Figure 7:
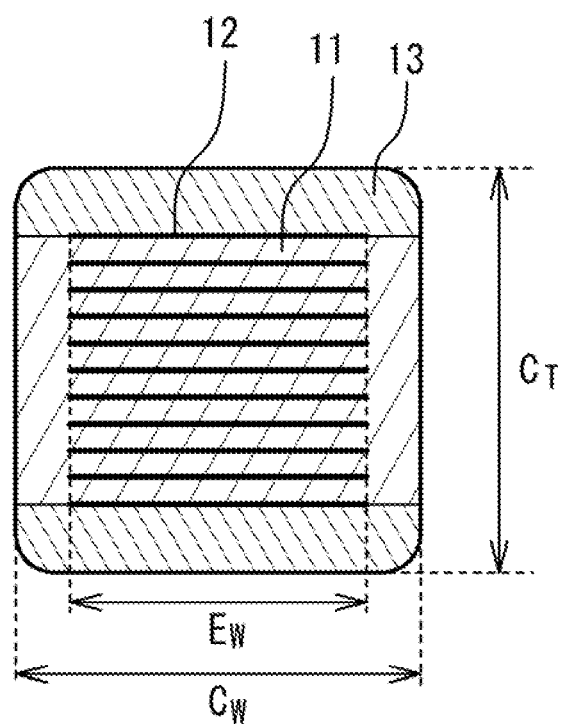
FIG. 7 illustrates a cross sectional view taken along a line B-B of FIG. 1.

As illustrated in FIG. 6 and FIG. 7, a length of the ceramic multilayer structure 10 is referred to as $C_L$. The length $C_L$ is a length in a facing direction of the external electrode 20a and the external electrode 20b. A width of the ceramic multilayer structure 10 is referred to as $C_W$. A thickness of the ceramic multilayer structure 10 in the stacking direction is referred to as $C_T$. In this case, the volume TA of the ceramic multilayer structure 10 is expressed by the following formula (1)

$$T_A = C_L \times C_W \times C_T \quad (1)$$

A length of the internal electrode layers 12 in the capacity region 14 is referred to as $E_L$. A width of the internal electrode layers 12 is referred to as $E_W$. A thickness of each of the internal electrode layers 12 is referred to as $E_T$. When there is variety in the thicknesses of the internal electrode layers 12, the thickness $E_T$ may be an average of the thicknesses of the internal electrode layers 12. In this case, the volume TE of the internal electrode layers 12 in the capacity region 14 is expressed by the following formula (2).

$$TE = E_L \times E_W \times E_T \times (\text{stacked number of the internal electrode layers 12}) \quad (2)$$

Figure 8:
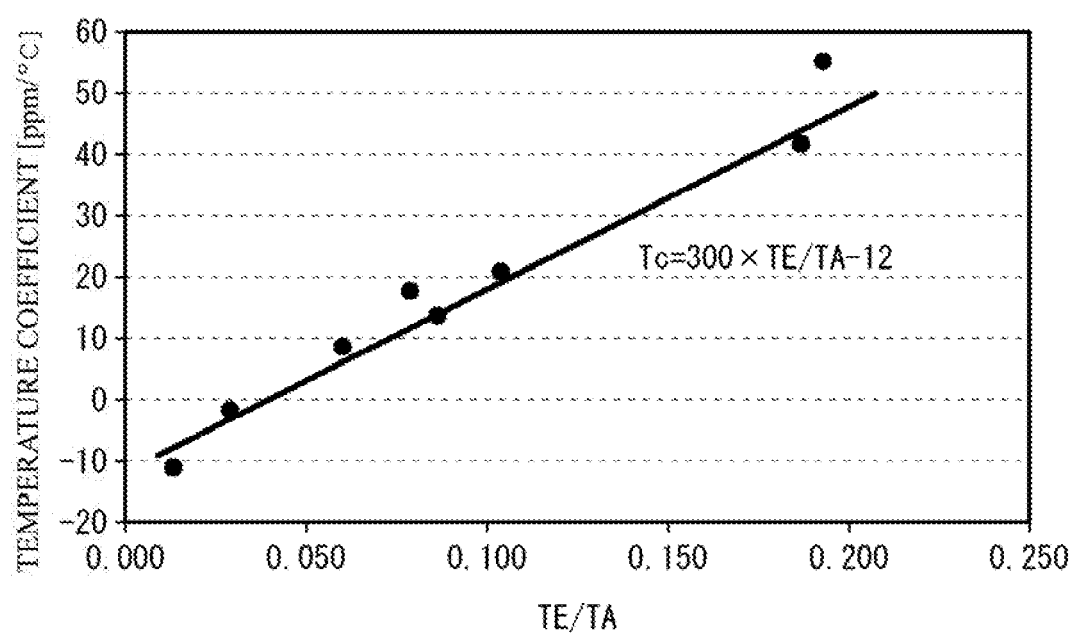
FIG. 8 illustrates measured results of a relationship between TE/TA and temperature characteristic Tc.

The present inventors have searched a relationship between TE/TA of the multilayer ceramic capacitor 100 and a temperature coefficient Tc [ppm/° C.]. Table 1, Table 2 and FIG. 8 show measured results. A sintering temperature of the ceramic multilayer structure 10 is 1135 degrees C. to 1155 degrees C. A main component of the ceramic dielectric layer 11 is $(Ba_{0.30}Ca_{0.15}Sr_{0.54})(Ti_{0.06}Zr_{0.94})O_3$. A main component of the internal electrode layers 12 is Ni. From the results of Table 1, Table 2 and FIG. 8, as TE/TA increases, the temperature coefficient Tc also increases. It is thought this is because a ratio of the internal electrode layers 12 of which the temperature coefficient [ppm/° C.] is large increases.

TABLE 1

| No. | TE mm$^3$ | $E_L$ (mm) | $E_W$ (mm) | $E_T$ (mm) | STACK NUMBER |
|---|---|---|---|---|---|
| 1 | 0.0140 | 0.470 | 0.173 | 0.0023 | 75 |
| 2 | 0.0063 | 0.471 | 0.174 | 0.0022 | 35 |
| 3 | 0.0134 | 0.473 | 0.176 | 0.0023 | 70 |
| 4 | 0.0042 | 0.473 | 0.175 | 0.0034 | 15 |
| 5 | 0.0021 | 0.474 | 0.174 | 0.0025 | 10 |
| 6 | 0.0010 | 0.472 | 0.172 | 0.0024 | 5 |
| 7 | 0.0020 | 0.290 | 0.075 | 0.0031 | 30 |
| 8 | 0.0017 | 0.291 | 0.072 | 0.0032 | 25 |
| 9 | 0.0002 | 0.132 | 0.043 | 0.0026 | 15 |

TABLE 2

| No. | TA mm$^3$ | $C_L$ (mm) | $C_T$ (mm) | $C_W$ (mm) | TE/TA | MEASURED TEMP. COEFFICIENT |
|---|---|---|---|---|---|---|
| 1 | 0.075 | 0.632 | 0.346 | 0.344 | 0.186 | 41.5 |
| 2 | 0.073 | 0.629 | 0.341 | 0.342 | 0.086 | 13.6 |
| 3 | 0.070 | 0.626 | 0.334 | 0.333 | 0.193 | 54.9 |
| 4 | 0.070 | 0.625 | 0.335 | 0.336 | 0.060 | 8.8 |
| 5 | 0.070 | 0.625 | 0.335 | 0.336 | 0.029 | −1.6 |
| 6 | 0.073 | 0.630 | 0.341 | 0.340 | 0.013 | −10.9 |
| 7 | 0.020 | 0.424 | 0.214 | 0.215 | 0.104 | 20.8 |
| 8 | 0.021 | 0.424 | 0.225 | 0.223 | 0.079 | 17.7 |
| 9 | 0.004 | 0.226 | 0.127 | 0.128 | 0.060 | −1.75 |

The plots of FIG. 8 are subjected to regression analysis. By the regression analysis, a regression line is calculated. Thus, the following formula (3) is obtained.

$$\text{Temperature coefficient } Tc = 300 \times TE/TA - 12 \quad (3)$$

In the embodiment, the temperature coefficient Tc is 30 or less (CG characteristic). Therefore, the volume TA of the ceramic multilayer structure 10 and the volume TE of the internal electrode layers 12 in the capacity region 14 are regulated so as to satisfy the following formula (4).

$$300 \times TE/TA - 12 \leq 30 \quad (4)$$

When the ratio of the volume TA and the volume TE is selected so as to satisfy the formula (4) between TE/TA and the temperature coefficient, it is possible to provide a multilayer ceramic capacitor for temperature compensation having target temperature characteristic. Even if the sintering temperature of the ceramic multilayer structure 10 is not reduced, desirable temperature characteristic is obtained. Thus, it is possible to form the ceramic multilayer structure 10 at a higher temperature. Therefore, sufficient sintering is achieved, and the ceramic dielectric layers 11 are sufficiently densified. Therefore, desirable moisture resistance is achieved. It is therefore possible to achieve both desirable temperature characteristic and desirable moisture resistance. It is possible to suppress unevenness of the color of the ceramic multilayer structure 10, because sufficient sintering is achieved.

It is possible to enlarge the electrical capacity of the multilayer ceramic capacitor 100 by reducing an average thickness of the internal electrode layers 12 and enlarging the number of the stacked internal electrode layers 12. And so, it is preferable that the average thickness of the internal electrode layers 12 is 1 μm or more and 70 μm or less. It is more preferable that the average thickness of the internal electrode layers 12 is 2 μm or more and 30 μm or less. It is preferable that the number of the stacked internal electrode layers 12 is 4 or more.

It is preferable that the base conductive layer 21 includes the main component ceramic of the ceramic dielectric layer 11. For example, the base conductive layer 21 includes $BaCaSrTiZrO_3$, when the main component ceramic of the ceramic dielectric layer 11 is $BaCaSrTiZrO_3$. This is because a difference between the sintering characteristic of the base conductive layer 21 and the sintering characteristic of the ceramic dielectric layer 11 is reduced.

It is preferable that Ni plating is used for forming the first plated layer 22, affinity between the first plated layer 22 and solder used for mounting the multilayer ceramic capacitor 100 is considered. It is preferable that a main component of the second plated layer 23 is a transition metal that is different from a main component transition metal of the first plated layer 22. For example, it is preferable that a main component of the second plated layer 23 is a transition metal such as Sn (tin), affinity between the second plated layer 23 and the solder used for mounting the multilayer ceramic capacitor 100 is considered. When the main component of the base conductive layer 21 is Ni, it is preferable that a base plated layer made of Cu is formed between the base conductive layer 21 and the first plated layer 22.

Figure 9:
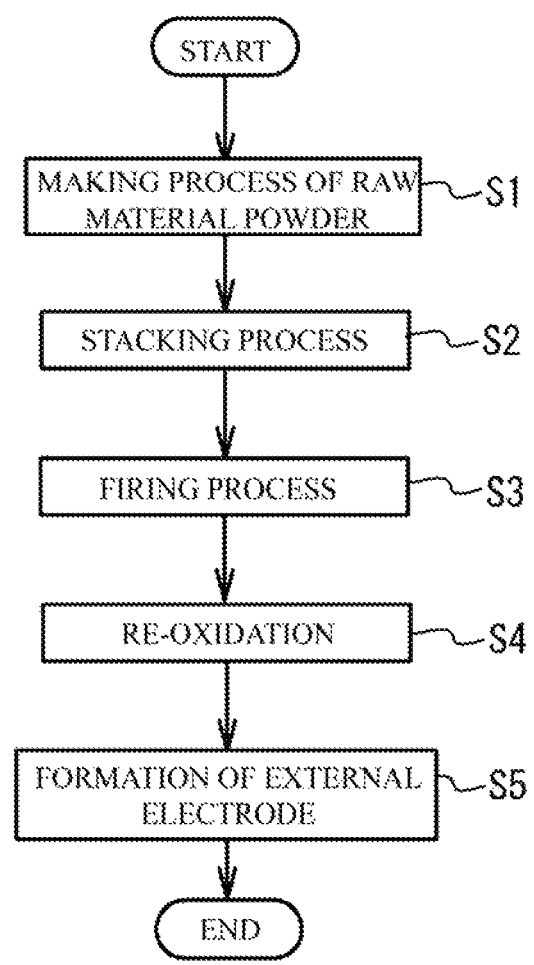
FIG. 9 illustrates a manufacturing method of the multilayer ceramic capacitor.

Next, a description will be given of a manufacturing method of the multilayer ceramic capacitor 100. FIG. 9 illustrates a manufacturing method of the multilayer ceramic capacitor 100.

(Making Process of a Raw Material Powder)

Additive compound may be added to ceramic material powder that is a main component of the ceramic dielectric layer 11, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co, Ni, Li (lithium), B (boron), Na (sodium), K (potassium) and Si, or glass. For example, compound including the additive is mixed with ceramic material powder and is calcined. Next, the ceramic material powder is wet-blended with the additive, dried and crushed. Thus, the ceramic material powder is prepared.

Next, a binder such as polyvinyl butyral (PVB) resin, an organic solvent such as ethanol or toluene, and a plasticizer are added to the resulting ceramic powder and wet-blended. With use of the resulting slurry, a strip-shaped dielectric green sheet with a thickness of 5 μm to 20 μm is coated on a base material by, for example, a die coater method or a doctor blade method, and then dried.

(Stacking Process)

Then, a pattern of the internal electrode layer 12 is provided on the surface of the dielectric green sheet by printing metal conductive pastes for forming an internal electrode with use of screen printing or gravure printing. The conductive pastes include powder of the main component metal of the internal electrode layer 12, a binder, a solvent and assistant if needed. The binder and the solvent may be the same as those of the ceramic paste. As a co-material, a ceramic material acting as the main component of the ceramic dielectric layer 11 may be dispersed in the conductive paste.

Then, the dielectric green sheet on which the internal electrode layer pattern is printed is stamped into a predetermined size, and a predetermined number (for example, 4 to 50) of stamped dielectric green sheets are stacked while the base material is peeled so that the internal electrode layers 12 and the ceramic dielectric layers 11 are alternated with each other and the end edges of the internal electrode layers 12 are alternately exposed to both end faces in the length direction of the dielectric layer so as to be alternately led out to a pair of external electrodes of different polarizations. Dielectric green sheets, which are to be the cover layers 13, are stacked on the stacked dielectric green sheets and under the stacked dielectric green sheets. The resulting compact is cut into a predetermined size (for example, 0.6 mm×0.3 mm). Thus, a ceramic multilayer structure having a parallelepiped shape is obtained.

(Firing Process)

The ceramic multilayer structure on which a metal paste for forming the external electrode is coated is fired for 2 hours or the like in reductive atmosphere including 1.0 volume % of H2 at a sintering temperature of 1100 degrees C. to 1400 degrees C. In this manner, a sintered structure having the ceramic multilayer structure 10, in which each of the sintered ceramic dielectric layers 11 and each of the sintered internal electrode layers 12 are alternately stacked, the cover layers 13 formed as outermost layers in the stacking direction, and the base conductive layer 21 is obtained. It is preferable that the sintering temperature is 1100 degrees C. to 1200 degrees C., in order to suppress degradation of the temperature characteristic caused by excessive sintering.

(Forming Process of External Electrodes)

The first plated layer 22 is formed on the base conductive layer 21 by plating. Moreover, the second plated layer 23 is formed on the first plated layer 22 by plating.

The base conductive layer 21 may be baked after the firing process. For example, a conductive paste for forming the base conductive layer is coated on two edge faces to which the sintered internal electrode layer pattern formed in the firing process is exposed. The conductive paste for forming the base conductive layer includes powder of the main component metal of the base conductive layer 21, a binder, a solvent and assistant if needed. The binder and the solvent may be the same as those of the ceramic paste. A sintering assistant for forming glass may be dispersed in the conductive paste for forming the base conductive layer in order to achieve adherence between the base conductive layer 21 and the ceramic multilayer structure 10. One or more network former oxides selected from $B_2O_3$ and $SiO_2$ and one or more network modifier oxides selected from Al(aluminum)$_2O_3$, Zn(zinc)O, CuO, $Li_2O$, $Na_2O$, $K_2O$, MgO, CaO, BaO, $ZrO_2$ and $TiO_2$ are used as the sintering assistant. Next, the base conductive layer 21 is fired in nitrogen atmosphere at a temperature (for example, 800 degrees C. to 900 degrees C.) lower than the firing temperature for forming the sintered structure. Thus, the base conductive layer 21 is baked. And, a semi-finished product is obtained. Next, the first plated layer 22 is formed on the base conductive layer 21 of the semi-finished product by electrolytic plating. Moreover, the second plated layer 23 is formed on the first plated layer 22 by electrolytic plating.

In the manufacturing method of the embodiment, the stacking process and the firing process are performed so that the relationship of 300×TE/TA−12≤30 is satisfied in the ceramic multilayer structure 10. Thus, desirable temperature characteristic is achieved. Even if the sintering temperature of the firing process is not reduced, desirable temperature characteristic is achieved. It is therefore possible to form the ceramic multilayer structure 10 at a high temperature such as 1100 degrees C. to 1200 degrees C. It is therefore possible to achieve sufficient sintering and desirable moisture resistance. Accordingly, it is possible to achieve both the desirable temperature characteristic and the desirable moisture resistance.

EXAMPLES

The multilayer ceramic capacitors of the embodiment were made. And characteristic of the multilayer ceramic capacitors were measured.

Examples 1 to 6 and Comparative Examples 1 to 9

$BaCaSrZrTiO_3$ was used as the main component ceramic material of the ceramic dielectric layer 11. Ni was used as the main component of the internal electrode layer 12. The atmosphere of the firing process was reductive atmosphere including 1.0 volume % of $H_2$. The temperature of the firing process was 1155 degrees C. Ni was used as the main component of the base conductive layer 21 of the external electrodes 20a and 20b. Cu was used as the base plated layer. Ni was used as the first plated layer 22. Sn was used as the second plated layer 23.

In the example 1, TE/TA was 0.126. In the example 2, TE/TA was 0.138. In the example 3, TE/TA was 0.134. In the example 4, TE/TA was 0.102. In the example 5, TE/TA was 0.110. In the example 6, TE/TA was 0.114. In the comparative example 1, TE/TA was 0.244. In the comparative example 2, TE/TA was 0.199. In the comparative example 3, TE/TA was 0.158. In the comparative example 4, TE/TA was 0.256. In the comparative example 5, TE/TA was 0.185. In the comparative example 6, TE/TA was 0.169. In the comparative example 7, TE/TA was 0.253. In the comparative example 8, TE/TA was 0.185. In the comparative example 9, TE/TA was 0.158.

(Analysis)

The temperature characteristic was measured with respect to the samples of the examples 1 to 6 and the comparative examples 1 to 9. Table 3 and Table 4 show the results. Any one of the examples 1 to 6 satisfied the CG characteristic (Tc≤30). It is thought that this was because the relationship of 300×TE/TA−12≤30 was satisfied. On the other hand, none of the comparative examples 1 to 9 satisfied the CG characteristic (Tc≤30). It is thought that this was because the relationship of 300×TE/TA−12≤30 was not satisfied.

TABLE 3

| | VOLUME TE (mm³) | $E_L$ (mm) | $E_W$ (mm) | $E_T$ (mm) | STACK NUMBER | VOLUME TA (mm³) | $C_L$ (mm) | $C_T$ (mm) | $C_W$ (mm) |
|---|---|---|---|---|---|---|---|---|---|
| EXAMPLE 1 | 0.0092 | 0.470 | 0.174 | 0.0014 | 80 | 0.073 | 0.630 | 0.339 | 0.341 |
| EXAMPLE 2 | 0.0100 | 0.473 | 0.171 | 0.0031 | 40 | 0.072 | 0.625 | 0.347 | 0.334 |
| EXAMPLE 3 | 0.0026 | 0.292 | 0.074 | 0.0015 | 80 | 0.019 | 0.421 | 0.215 | 0.213 |
| EXAMPLE 4 | 0.0020 | 0.288 | 0.072 | 0.0032 | 30 | 0.019 | 0.427 | 0.212 | 0.215 |
| EXAMPLE 5 | 0.0004 | 0.132 | 0.043 | 0.0013 | 50 | 0.003 | 0.225 | 0.121 | 0.123 |
| EXAMPLE 6 | 0.0004 | 0.136 | 0.045 | 0.0032 | 20 | 0.003 | 0.224 | 0.122 | 0.126 |
| COMPARATIVE EXAMPLE 1 | 0.0182 | 0.469 | 0.173 | 0.0028 | 80 | 0.074 | 0.631 | 0.342 | 0.345 |
| COMPARATIVE EXAMPLE 2 | 0.0143 | 0.471 | 0.172 | 0.0022 | 80 | 0.072 | 0.632 | 0.333 | 0.340 |
| COMPARATIVE EXAMPLE 3 | 0.0116 | 0.472 | 0.170 | 0.0029 | 50 | 0.073 | 0.628 | 0.345 | 0.339 |
| COMPARATIVE EXAMPLE 4 | 0.0049 | 0.293 | 0.077 | 0.0027 | 80 | 0.019 | 0.432 | 0.211 | 0.209 |
| COMPARATIVE EXAMPLE 5 | 0.0037 | 0.291 | 0.075 | 0.0021 | 80 | 0.020 | 0.429 | 0.219 | 0.211 |
| COMPARATIVE EXAMPLE 6 | 0.0035 | 0.295 | 0.078 | 0.0030 | 50 | 0.020 | 0.425 | 0.227 | 0.212 |
| COMPARATIVE EXAMPLE 7 | 0.0009 | 0.139 | 0.046 | 0.0029 | 50 | 0.004 | 0.226 | 0.128 | 0.127 |
| COMPARATIVE EXAMPLE 8 | 0.0006 | 0.134 | 0.048 | 0.0020 | 50 | 0.003 | 0.221 | 0.126 | 0.125 |
| COMPARATIVE EXAMPLE 9 | 0.0006 | 0.137 | 0.044 | 0.0031 | 30 | 0.004 | 0.222 | 0.124 | 0.129 |

TABLE 4

| | TE/TA | Tc | MEASURED CG CHARACTERISTIC |
|---|---|---|---|
| EXAMPLE 1 | 0.126 | 25.7 | ○ |
| EXAMPLE 2 | 0.138 | 29.5 | ○ |
| EXAMPLE 3 | 0.134 | 28.3 | ○ |
| EXAMPLE 4 | 0.102 | 18.7 | ○ |
| EXAMPLE 5 | 0.110 | 21.1 | ○ |
| EXAMPLE 6 | 0.114 | 22.1 | ○ |
| COMPARATIVE EXAMPLE 1 | 0.244 | 61.3 | x |
| COMPARATIVE EXAMPLE 2 | 0.199 | 47.8 | x |
| COMPARATIVE EXAMPLE 3 | 0.158 | 35.5 | x |
| COMPARATIVE EXAMPLE 4 | 0.256 | 64.7 | x |
| COMPARATIVE EXAMPLE 5 | 0.185 | 43.5 | x |
| COMPARATIVE EXAMPLE 6 | 0.169 | 38.6 | x |
| COMPARATIVE EXAMPLE 7 | 0.253 | 63.8 | x |
| COMPARATIVE EXAMPLE 8 | 0.185 | 43.4 | x |
| COMPARATIVE EXAMPLE 9 | 0.158 | 35.4 | x |

Figure 10:
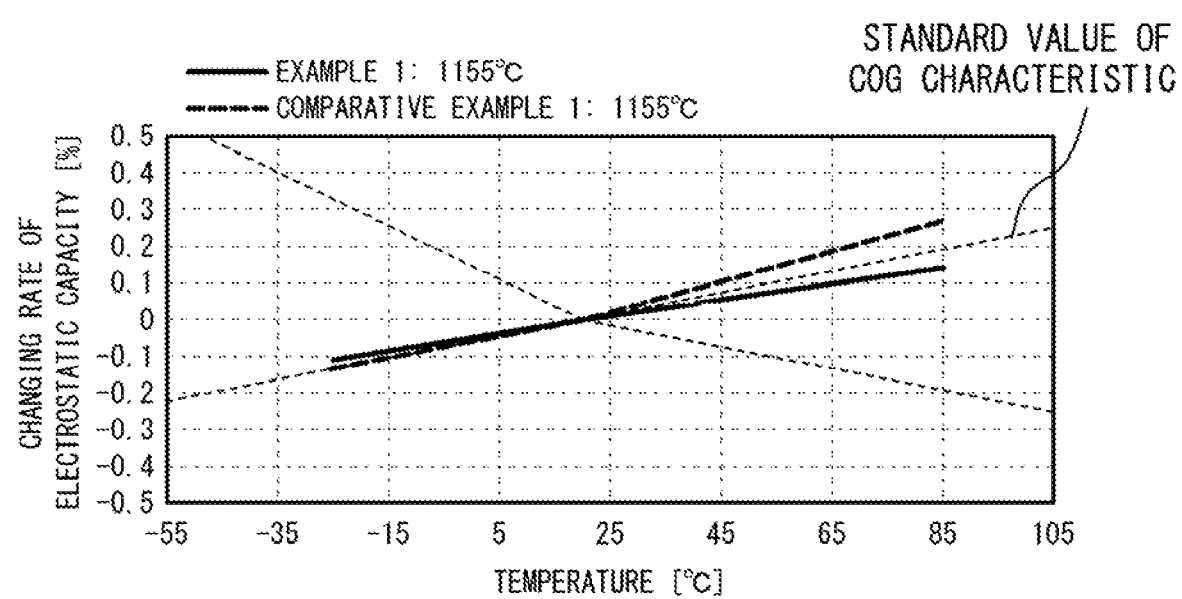
FIG. 10 illustrates measured results of temperature characteristic of an example 1 and a comparative example 1.

FIG. 10 illustrates measured results of the temperature characteristic of the example 1 and the comparative example 1. In FIG. 10, a dotted line indicates a standard value of the CG characteristic (0±30 ppm/° C.). In the example 1, the temperature coefficient Tc was 25.7 ppm/° C. The measured temperature characteristic satisfied the CG characteristic of 0±30 ppm/° C. In the examples 2 to 6, the similar result was obtained. On the other hand, in the comparative example 1, the temperature coefficient Tc was 61.3 ppm/° C. The measured temperature characteristic did not satisfy the CG characteristic of 0±30 ppm/° C. The comparative examples 2 to 9 did not satisfy the CG characteristic.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
a ceramic multilayer structure having a structure in which each of a plurality of ceramic dielectric layers and each of a plurality of internal electrode layers are alternately stacked, the plurality of internal electrode layers being alternately exposed to two edge faces of the ceramic multilayer structure, a main phase of the plurality of ceramic dielectric layers having a perovskite structure that includes Ca and Zr and is expressed by a general formula $ABO_3$; and
a pair of external electrodes that are formed on the two edge faces,
wherein 300×TE/TA−12≤30 is satisfied when a volume TA is a length $C_L$×a width $C_W$×a thickness $C_T$ of the ceramic multilayer structure and a volume TE is a length $E_L$×a width $E_W$×thickness $E_T$×a stacked number of the plurality of internal electrode layers in a capacity region, the capacity region being a region in which internal electrode layers next to each other are connected to different external electrodes and face each other, wherein the stacked number of the plurality of internal electrode layers is 30 or more and 80 or less, wherein the thickness $E_T$ of each of the plurality of internal electrode layers is more than 2 μm and 30 μm or less.

2. The multilayer ceramic capacitor as claimed in claim 1, wherein a main component of the ceramic dielectric layers is $Ba_{1-x-y}Ca_xSr_yTi_{1-z}Zr_zO_3$ (0<x≤1, 0.5<x+y≤1, 0.5<z≤1).

3. The multilayer ceramic capacitor as claimed in claim 1, wherein the external electrodes have a base conductive layer and a plated layer, the base conductive layer including a same ceramic as a main component of the ceramic dielectric layers and directly contacting the ceramic multilayer structure, the plated layer covering the base conductive layer.

4. The multilayer ceramic capacitor as claimed in claim 1, wherein a main component of the ceramic dielectric layers is $(Ba_{0.30}Ca_{0.15}Sr_{0.54})(Ti_{0.06}Zr_{0.94})O_3$.

5. The multilayer ceramic capacitor as claimed in claim 1, wherein the stacked number of the plurality of internal electrode layers is 70 or more and 80 or less.

6. A circuit substrate comprising:
   a substrate; and
   a multilayer ceramic capacitor of claim 1 mounted on the substrate.

7. A manufacturing method of a multilayer ceramic capacitor comprising:
   forming a multilayer structure by alternately stacking a green sheet including a ceramic grain and a conductive paste for forming an internal electrode layer, the conductive paste including a ceramic co-material;
   forming a ceramic multilayer structure by firing the multilayer structure; and
   forming an external electrode on each edge face of the ceramic multilayer structure to which the internal electrode layer is exposed,
   wherein the stacking and the firing are performed so that $300 \times TE/TA - 12 \leq 30$ is satisfied when a volume TA is a length $C_L \times$ a width $C_W \times$ a thickness $C_T$ of the ceramic multilayer structure and a volume TE is a length $E_L \times$ a width $E_W \times$ a thickness $E_T \times$ a stacked number of the internal electrode layer in a capacity region, the capacity region being a region in which internal electrode layers next to each other are connected to different external electrodes and face each other, wherein the stacked number of the plurality of internal electrode layers is 30 or more and 80 or less, wherein the thickness $E_T$ of each of the plurality of internal electrode layers is more than 2 μm and 30 μm or less.

8. The method as claimed in claim 7, wherein a sintering temperature in the firing process is 1100 degrees C. to 1400 degrees C.

9. The method as claimed in claim 7, wherein a main component of the ceramic dielectric layers is $(Ba_{0.30}Ca_{0.15}Sr_{0.54})(Ti_{0.06}Zr_{0.94})O_3$.

10. The method as claimed in claim 7, wherein the stacked number of the plurality of internal electrode layers is 70 or more and 80 or less.

* * * * *